(12) United States Patent
Shimano et al.

(10) Patent No.: US 9,303,112 B2
(45) Date of Patent: Apr. 5, 2016

(54) PROPYLENE RESIN MATERIAL AND METHOD FOR THE PRODUCTION THEREOF

(71) Applicant: Sumitomo Chemical Company, Limited, Chuo-ku, Tokyo (JP)

(72) Inventors: Mitsuyoshi Shimano, Ichihara (JP); Hiroyoshi Nakajima, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/028,768

(22) Filed: Sep. 17, 2013

(65) Prior Publication Data

US 2014/0088255 A1    Mar. 27, 2014

(30) Foreign Application Priority Data

Sep. 24, 2012  (JP) .................. 2012-209240

(51) Int. Cl.
| | | |
|---|---|---|
| C08F 293/00 | (2006.01) | |
| C08L 53/00 | (2006.01) | |
| C08L 23/12 | (2006.01) | |
| C08K 5/14 | (2006.01) | |

(52) U.S. Cl.
CPC .................. *C08F 293/00* (2013.01); *C08K 5/14* (2013.01); *C08L 23/12* (2013.01); *C08L 53/005* (2013.01)

(58) Field of Classification Search
USPC .................................................. 525/88, 194
See application file for complete search history.

(56) References Cited

U.S. PATENT DOCUMENTS

| | | |
|---|---|---|
| 2003/0119996 A1 | 6/2003 | Kitano et al. |
| 2012/0245296 A1 | 9/2012 | Nakajima et al. |
| 2012/0245297 A1 | 9/2012 | Nakajima et al. |
| 2012/0245302 A1 | 9/2012 | Nakajima et al. |

FOREIGN PATENT DOCUMENTS

| | | | |
|---|---|---|---|
| EP | 0534776 | * | 9/1992 |
| JP | S56-125442 A | | 10/1981 |
| JP | S58-210949 A | | 12/1983 |

OTHER PUBLICATIONS

Kumamoto et al., partial electronic translation of JP 2004-182981, Jul. 2004.*

* cited by examiner

*Primary Examiner* — Jeffrey Mullis
(74) *Attorney, Agent, or Firm* — Panitch Schwarze Belisario & Nadel LLP

(57) ABSTRACT

Disclosed are a propylene resin material capable of affording a molded article superior in impact properties, tensile properties, and appearance, and a method for producing the same. The propylene resin material includes a propylene homopolymer portion and a propylene-ethylene copolymer portion and satisfies specific requirements. The production method includes the step of mixing an organic peroxide with a propylene polymeric material produced via a multistage polymerization process using a polymerization catalyst and comprising a propylene homopolymer portion and a propylene-ethylene copolymer portion, the step of heating the mixture obtained via the mixing step, at a temperature lower than a decomposition temperature of the organic peroxide at which the half-life of the organic peroxide is one minute, and the step of washing the mixture heated in the heating step, with a medium containing an organic solvent.

4 Claims, No Drawings

PROPYLENE RESIN MATERIAL AND METHOD FOR THE PRODUCTION THEREOF

BACKGROUND OF THE INVENTION

1. Technical Field

The present invention relates to a propylene resin material and a method for the production thereof. Particularly, the present invention relates to a propylene resin material that can afford a molded article superior in impact properties, tensile properties, and appearance, and a method for the production of the propylene resin material. The present invention also relates to a resin composition comprising a propylene resin material and a propylene polymeric material, the resin composition being capable of affording a molded article superior in impact properties and tensile properties.

2. Background Art

Propylene polymers are used in the fields of household electric appliances, building materials, medical applications, automobiles, etc.

As a technology for improving the tensile strength or the impact properties of a propylene polymer, there is disclosed in JP 58-210949 A, for example, a method for producing a impact-resistant polypropylene composition comprising mixing an ethylene-α-olefin copolymer resin with a polypropylene, and then conducting molecular weight reduction using an organic peroxide having a 1-minute half-life of from about 140° C. to about 260° C. so as to alter the MFI to 2 to 100 times the MFI of the original polypropylene.

JP 2003-171515 A discloses a modified polypropylene resin prepared by mixing (A) a polypropylene resin, (B) a functional compound having a bond or a functional group selected from the group consisting of non-aromatic, carbon-carbon multiple bonds, an oxirane group, and derived carboxyl groups, (C) a compound having in one molecule two or more functional groups reactable with a carboxylic acid, and (D) an organic peroxide having a decomposition temperature of from 50 to 120° C. at which the half-life of the organic peroxide is 1 minute, and making these compounds react together, and also discloses a method for producing the modified polypropylene resin.

However, molded articles produced from the impact-resistant polypropylene composition of JP 58-210949 A or the polypropylene resin disclosed in JP 2003-171515 A are unsatisfactory in impact properties, tensile properties, and appearance.

SUMMARY OF THE INVENTION

The present invention intends to solve the above-described problems, and an object thereof is to provide a propylene resin material that can afford a molded article superior in impact properties, tensile properties, and appearance, and a method for producing such a propylene resin material. Another object is to provide a resin composition comprising a propylene resin material and a propylene polymeric material, the resin composition being capable of affording a molded article superior in impact properties, tensile properties, and appearance.

In one aspect, the present invention relates to a propylene resin material comprising a propylene homopolymer portion (I) and a propylene-ethylene copolymer portion (II), wherein the propylene resin material satisfies the following requirements (1), (2), (3), and (4):

requirement (1): the copolymer portion (II) comprises constitutional units derived from propylene and constitutional units derived from ethylene, wherein the content of the constitutional units derived from ethylene is 20 to 70% by weight where the overall weight of the copolymer portion (II) is taken as 100% by weight;

requirement (2): the value of EPcxis calculated from a formula: EPcxis=(C2'CSIS/C2'CSX)×100 is 100 or more where the content of the constitutional units derived from ethylene contained in the components soluble in xylene at 20° C. of the propylene resin material is represented by C2'CXS, the components soluble in xylene at 20° C. are collectively named CXS, the content of the constitutional units derived from ethylene contained in the components insoluble in xylene at 20° C. of the propylene resin material is represented by C2'CXIS, the components insoluble in xylene at 20° C. are collectively named CXIS;

requirement (3): the arithmetic mean of the polypropylene resin material determined by the following procedures (1) through (5) is 20% or less;

(1) the contents of five types of triads $PPE_{CXS}$, $EPE_{CXS}$, $PEP_{CXS}$, $PEE_{CXS}$, and $EEE_{CXS}$ contained in the CXS, and the contents of five types of triads $PPE_{CXIS}$, $EPE_{CXIS}$, $PEP_{CXIS}$, $PEE_{CXIS}$, and $EEE_{CXIS}$ contained in the CXIS are measured using $^{13}$C—NMR;

(2) the ratios, $PPE^{EP}_{CXS}$, $EPE^{EP}_{CXS}$, $PEP^{EP}_{CXS}$, $PEE^{EP}_{CXS}$, and $EEE^{EP}_{CXS}$, of the respective five types of triads contained in the CXS to the sum total of the contents of the five types of triads are calculated from the following equations;

$$PPE^{EP}_{CXS} = \frac{PPE_{CXS}}{PPE_{CXS} + EPE_{CXS} + PEP_{CXS} + PEE_{CXS} + EEE_{CXS}}$$

$$EPE^{EP}_{CXS} = \frac{EPE_{CXS}}{PPE_{CXS} + EPE_{CXS} + PEP_{CXS} + PEE_{CXS} + EEE_{CXS}}$$

$$PEP^{EP}_{CXS} = \frac{PEP_{CXS}}{PPE_{CXS} + EPE_{CXS} + PEP_{CXS} + PEE_{CXS} + EEE_{CXS}}$$

$$PEE^{EP}_{CXS} = \frac{PEE_{CXS}}{PPE_{CXS} + EPE_{CXS} + PEP_{CXS} + PEE_{CXS} + EEE_{CXS}}$$

$$EEE^{EP}_{CXS} = \frac{EEE_{CXS}}{PPE_{CXS} + EPE_{CXS} + PEP_{CXS} + PEE_{CXS} + EEE_{CXS}}$$

(3) the ratios, $PPE^{EP}_{CXIS}$, $EPE^{EP}_{CXIS}$, $PEP^{EP}_{CXIS}$, $PEE^{EP}_{CXIS}$, and $EEE^{EP}_{CXIS}$, of the respective five types of triads contained in the CXIS to the sum total of the contents of the five types of triads are calculated from the following equations;

$$PPE^{EP}_{CXIS} = \frac{PPE_{CXIS}}{PPE_{CXIS} + EPE_{CXIS} + PEP_{CXIS} + PEE_{CXIS} + EEE_{CXIS}}$$

$$EPE^{EP}_{CXIS} = \frac{EPE_{CXIS}}{PPE_{CXIS} + EPE_{CXIS} + PEP_{CXIS} + PEE_{CXIS} + EEE_{CXIS}}$$

$$PEP^{EP}_{CXIS} = \frac{PEP_{CXIS}}{PPE_{CXIS} + EPE_{CXIS} + PEP_{CXIS} + PEE_{CXIS} + EEE_{CXIS}}$$

$$PEE^{EP}_{CXIS} = \frac{PEE_{CXIS}}{PPE_{CXIS} + EPE_{CXIS} + PEP_{CXIS} + PEE_{CXIS} + EEE_{CXIS}}$$

$$EEE^{EP}_{CXIS} = \frac{EEE_{CXIS}}{PPE_{CXIS} + EPE_{CXIS} + PEP_{CXIS} + PEE_{CXIS} + EEE_{CXIS}}$$

(4) using $PPE^{EP}_{CXS}$, $EPE^{EP}_{CXS}$, $PEP^{EP}_{CXS}$, $PEE^{EP}_{CXS}$, and $EEE^{EP}_{CXS}$ calculated in the above (2) and $PPE^{EP}_{CXIS}$, $EPE^{EP}_{CXIS}$, $PEP^{EP}_{CXIS}$, $PEE^{EP}_{CXIS}$, and $EEE^{EP}_{CXIS}$ calculated in the above (3), the absolute value ($\Delta PPE^{EP}$) of the difference between $PPE^{EP}_{CXS}$ and $PPE^{EP}_{CXIS}$,
the absolute value ($\Delta EPE^{EP}$) of the difference between $EPE^{EP}_{CXS}$ and $EPE^{EP}_{CXIS}$,
the absolute value ($\Delta PEP^{EP}$) of the difference between $PEP^{EP}_{CXS}$ and $PEP^{EP}_{CXIS}$,
the absolute value ($\Delta PEE^{EP}$) of the difference between $PEE^{EP}_{CXS}$ and $PEE^{EP}_{CXIS}$, and
the absolute value ($\Delta EEE^{EP}$) of the difference between $EEE^{EP}_{CXS}$ and $EEE^{EP}_{CXIS}$ are calculated from the following equations, $$\Delta PPE^{EP} = |PPE^{EP} cxis - PPE^{EP} CXS|$$

$$\Delta EPE^{EP} = |EPE^{EP} cxis - EPE^{EP} CXS|$$

$$\Delta PEP^{EP} = |PEP^{EP} cxis - PEP^{EP} CXS|$$

$$\Delta PEE^{EP} = |PEE^{EP} cxis - PEE^{EP} CXS|$$

$$\Delta EEE^{EP} = |EEE^{EP} cxis - EEE^{EP} CXS|$$

(5) using $\Delta PPE^{EP}$, $\Delta EPE^{EP}$, $\Delta PEP^{EP}$, $\Delta PEE^{EP}$, and $\Delta EEE^{EP}$ calculated in the above (4), the arithmetic mean $\Delta EP$ is calculated from the following equation, $$\Delta EP = \frac{\Delta PPE^{EP} + \Delta EPE^{EP} + \Delta PEP^{EP} + \Delta EEP^{EP} + \Delta EEE^{EP}}{5} \times 100$$

where
P denotes a constitutional unit derived from propylene,
E denotes a constitutional unit derived from ethylene,
PPE denotes a triad composed of a constitutional unit derived from propylene, another constitutional unit derived from propylene, and a constitutional unit derived from ethylene,
EPE denotes a triad composed of a constitutional unit derived from ethylene, a constitutional unit derived from propylene, and another constitutional unit derived from ethylene,
PEP denotes a triad composed of a constitutional unit derived from propylene, a constitutional unit derived from ethylene, and another constitutional unit derived from propylene,
PEE denotes a triad composed of a constitutional unit derived from propylene, a constitutional unit derived from ethylene, and another constitutional unit derived from ethylene,
EEE denotes a triad composed of a constitutional unit derived from ethylene, another constitutional unit derived from ethylene, and still another constitutional unit derived from ethylene,
requirement (4): the amount of the components insoluble in boiling xylene of the propylene resin material is 4% by weight or less, where the overall weight of the propylene resin material is taken as 100% by weight.

In another aspect, the present invention relates to a method for producing the above-mentioned propylene resin material, the method comprising
the step of mixing an organic peroxide with a propylene polymeric material produced via a multistage polymerization process using a polymerization catalyst and comprising a propylene homopolymer portion and a propylene-ethylene copolymer portion,
the step of heating the mixture obtained via the mixing step, at a temperature lower than a decomposition temperature of the organic peroxide at which the half-life of the organic peroxide is one minute, and
the step of washing the mixture heated in the heating step, with a medium containing an organic solvent.

In still another aspect, the present invention relates to a resin composition comprising
the aforementioned propylene resin material, and
a propylene polymeric material produced via a multistage polymerization process using a polymerization catalyst and comprising a propylene homopolymer portion and a propylene-ethylene copolymer portion.

In still another aspect, the present invention relates to a resin composition comprising
the aforementioned propylene resin material, and
a propylene polymeric material produced via a multistage polymerization process using a polymerization catalyst and comprising a propylene homopolymer portion and a propylene-ethylene copolymer portion, and
an ethylene-α-olefin copolymer rubber.

According to the present invention, there can be obtained a propylene resin material that can afford a molded article superior in impact properties, tensile properties, and appearance. Moreover, there can also be obtained a resin composition comprising a propylene resin material and a propylene polymeric material, the resin composition being capable of affording a molded article superior in impact properties, tensile properties, and appearance.

DESCRIPTION OF THE PREFERRED EMBODIMENTS

[Propylene Resin Material]

The propylene resin material of the present invention is composed of a propylene homopolymer portion (I) and a propylene-ethylene copolymer portion (II).

The copolymer portion (II) constituting the propylene resin material of the present invention comprises constitutional units derived from propylene and constitutional units derived from ethylene, wherein the content of the constitutional units derived from ethylene is 20 to 70% by weight where the overall weight of the copolymer portion (II) is taken as 100% by weight (requirement (1)). The adjustment of the content of the constitutional units derived from ethylene to 20 to 70% by weight improves the impact properties and the tensile elongation of molded articles.

The content of the constitutional units derived from ethylene contained in the copolymer portion (II) constituting the propylene resin material of the present invention can be adjusted to 20 to 70% by weight by the use, in the production of the propylene resin material of the present invention, of a propylene polymeric material produced via a multistage polymerization process using a polymerization catalyst and comprising a propylene homopolymer portion and a propylene-ethylene copolymer portion, wherein the content of the constitutional units derived from ethylene contained in the propylene-ethylene copolymer portion of the propylene polymeric material is 20 to 70% by weigh.

The value of EPcxis calculated from a formula: EPcxis=(C2'CSIS/C2'CSX)×100 is 100 or more where the content of the constitutional units derived from ethylene contained in the components soluble in xylene at 20° C. of the propylene resin material of the present invention is represented by C2'CXS, the components soluble in xylene at 20° C. are collectively named CXS, the content of the constitutional units derived from ethylene contained in the components insoluble in xylene at 20° C. of the propylene resin material is represented by C2'CXIS, the components insoluble in xylene at 20° C. are collectively named CXIS (requirement (2)).

The CXS and the CXIS of a propylene resin composition are determined by the method described below.

A propylene resin material is added to xylene, which is then boiled to dissolve the propylene resin material completely therein and then cooled. Conditioning is conducted at 20° C. for one hour or longer, the resulting mixture is divided with filter paper into soluble components and insoluble components. Subsequently, the sample remaining on the filter paper is dried to afford CXIS. On the other hand, the solvent is removed from the filtrate and the residue is dried to afford CXS.

The content of the constitutional units derived from ethylene contained in the CXS (this content is denoted by C2'CXS), and the content of the constitutional units derived from ethylene contained in the CXIS (this content is denoted by C2'CXIS) are determined by measuring a $^{13}$C—NMR spectrum of the CXS or the CXIS using a nuclear magnetic resonance spectrometer (NMR), and then calculating the target contents using the NMR measurements in accordance with the method disclosed in the report by Kakugo et al. (Macromolecules, 1982, Vol. 15, pp. 1150-1152).

The value (EPcxis) calculated from a formula: EPcxis= (C2'CSIS/C2'CSX)×100 is 100 or more, preferably 110 or more, and more preferably 120 or more. The adjustment of EPcxis to 100 or more can improve the impact properties and the tensile elongation of molded articles.

The arithmetic mean (ΔEP) of the polypropylene resin material of the present invention determined via the procedures (1) through (5) described below is 20% or less (requirement (3)). The arithmetic mean (ΔEP) represents the similarity in composition distribution between the ethylene-propylene copolymer portion (named EP portion) existing in the CXS and the EP portion existing in the CXIS.

The arithmetic mean (ΔEP) of the polypropylene resin material of the present invention is preferably 15% or less, more preferably 10% or less, even more preferably 5% or less, and still even more preferably 3% or less. The adjustment of ΔEP to 20% or more can improve the impact properties and the tensile elongation of molded articles.

The arithmetic mean (ΔEP) is determined by the following procedures (1) through (5), (1) the contents of five types of triads $PPE_{CXS}$, $EPE_{CXS}$, $PEP_{CXS}$, $PEE_{CXS}$, and $EEE_{CXS}$ contained in the CXS, and the contents of five types of triads $PPE_{CXIS}$, $EPE_{CXIS}$, $PEP_{CXIS}$, $PEE_{CXIS}$, and $EEE_{CXIS}$ contained in the CXIS are measured using $^{13}$C—NMR;

(2) the ratios, $PPE^{EP}_{CXS}$, $EPE^{EP}_{CXS}$, $PEP^{EP}_{CXS}$, $PEE^{EP}_{CXS}$, and $EEE^{EP}_{CXS}$, of the respective five types of triads contained in the CXS to the sum total of the contents of the five types of triads are calculated from the following equations;

$$PPE^{EP}_{CXS} = \frac{PPE_{CXS}}{PPE_{CXS} + EPE_{CXS} + PEP_{CXS} + PEE_{CXS} + EEE_{CXS}}$$

$$EPE^{EP}_{CXS} = \frac{EPE_{CXS}}{PPE_{CXS} + EPE_{CXS} + PEP_{CXS} + PEE_{CXS} + EEE_{CXS}}$$

$$PEP^{EP}_{CXS} = \frac{PEP_{CXS}}{PPE_{CXS} + EPE_{CXS} + PEP_{CXS} + PEE_{CXS} + EEE_{CXS}}$$

$$PEE^{EP}_{CXS} = \frac{PEE_{CXS}}{PPE_{CXS} + EPE_{CXS} + PEP_{CXS} + PEE_{CXS} + EEE_{CXS}}$$

$$EEE^{EP}_{CXS} = \frac{EEE_{CXS}}{PPE_{CXS} + EPE_{CXS} + PEP_{CXS} + PEE_{CXS} + EEE_{CXS}}$$

(3) the ratios, $PPE^{EP}_{CXIS}$, $EPE^{EP}_{CXIS}$, $PEP^{EP}_{CXIS}$, $PEE^{EP}_{CXIS}$, and $EEE^{EP}_{CXIS}$, of the respective five types of triads contained in the CXIS to the sum total of the contents of the five types of triads are calculated from the following equations;

$$PPE^{EP}_{CXIS} = \frac{PPE_{CXIS}}{PPE_{CXIS} + EPE_{CXIS} + PEP_{CXIS} + PEE_{CXIS} + EEE_{CXIS}}$$

$$EPE^{EP}_{CXIS} = \frac{EPE_{CXIS}}{PPE_{CXIS} + EPE_{CXIS} + PEP_{CXIS} + PEE_{CXIS} + EEE_{CXIS}}$$

$$PEP^{EP}_{CXIS} = \frac{PEP_{CXIS}}{PPE_{CXIS} + EPE_{CXIS} + PEP_{CXIS} + PEE_{CXIS} + EEE_{CXIS}}$$

$$PEE^{EP}_{CXIS} = \frac{PEE_{CXIS}}{PPE_{CXIS} + EPE_{CXIS} + PEP_{CXIS} + PEE_{CXIS} + EEE_{CXIS}}$$

$$EEE^{EP}_{CXIS} = \frac{EEE_{CXIS}}{PPE_{CXIS} + EPE_{CXIS} + PEP_{CXIS} + PEE_{CXIS} + EEE_{CXIS}}$$

(4) using $PPE^{EP}_{CXS}$, $EPE^{EP}_{CXS}$, $PEP^{EP}_{CXS}$, $PEE^{EP}_{CXS}$, and $EEE^{EP}_{CXS}$ calculated in the above (2) and $PPE^{EP}_{CXIS}$, $EPE^{EP}_{CXIS}$, $PEP^{EP}_{CXIS}$, $PEE^{EP}_{CXIS}$, and $EEE^{EP}_{CXIS}$ calculated in the above (3), the absolute value ($\Delta PPE^{EP}$) of the difference between $PPE^{EP}_{CXS}$ and $PPE^{EP}_{CXIS}$, the absolute value ($\Delta EPE^{EP}$) of the difference between $EPE^{EP}_{CXS}$ and $EPE^{EP}_{CXIS}$, the absolute value ($\Delta PEP^{EP}$) of the difference between $PEP^{EP}_{CXS}$ and $PEP^{EP}_{CXIS}$, the absolute value ($\Delta PEE^{EP}$) of the difference between $PEE^{EP}_{CXS}$ and $PEE^{EP}_{CXIS}$, and the absolute value ($\Delta EEE^{EP}$) of the difference between $EEE^{EP}_{CXS}$ and $EEE^{EP}_{CXIS}$ are calculated from the following equations, $$\Delta PPE^{EP} = |PPE^{EP}cxis - PPE^{EP}CXS|$$

$$\Delta EPE^{EP} = |EPE^{EP}cxis - EPE^{EP}CXS|$$

$$\Delta PEP^{EP} = |PEP^{EP}cxis - PEP^{EP}CXS|$$

$$\Delta PEE^{EP} = |PEE^{EP}cxis - PEE^{EP}CXS|$$

$$\Delta EEE^{EP} = |EEE^{EP}cxis - EEE^{EP}CXS|$$

(5) using $\Delta PPE^{EP}$, $\Delta EPE^{EP}$, $\Delta PEP^{EP}$, $\Delta PEE^{EP}$, and $\Delta EEE^{EP}$ calculated in the above (4), the arithmetic mean ΔEP is calculated from the following equation, $$\Delta EP = \frac{\Delta PPE^{EP} + \Delta EPE^{EP} + \Delta PEP^{EP} + \Delta EEP^{EP} + \Delta EEE^{EP}}{5} \times 100$$

where

P denotes a constitutional unit derived from propylene,

E denotes a constitutional unit derived from ethylene,

PPE denotes a triad composed of a constitutional unit derived from propylene, another constitutional unit derived from propylene, and a constitutional unit derived from ethylene, EPE denotes a triad composed of a constitutional unit derived from ethylene, a constitutional unit derived from propylene, and another constitutional unit derived from ethylene, PEP denotes a triad composed of a constitutional unit derived from propylene, a constitutional unit derived from ethylene, and another constitutional unit derived from propylene, PEE denotes a triad composed of a constitutional unit derived from propylene, a constitutional unit derived from ethylene, and another constitutional unit derived from ethylene, EEE denotes a triad composed of a constitutional unit derived from ethylene, another constitutional unit derived from ethylene, and still another constitutional unit derived from ethylene, where P denotes a constitutional unit derived from propylene, E denotes a constitutional unit derived from ethylene, PPE denotes a triad composed of a constitutional unit derived from propylene, another constitutional unit derived from propylene, and a constitutional unit derived from ethylene, EPE denotes a triad composed of a constitutional unit derived from ethylene, a constitutional unit derived from propylene, and another constitutional unit derived from ethylene, PEP denotes a triad composed of a constitutional unit derived from propylene, a constitutional unit derived from ethylene, and another constitutional unit derived from propylene, PEE denotes a triad composed of a constitutional unit derived from propylene, a constitutional unit derived from ethylene, and another constitutional unit derived from ethylene, EEE denotes a triad composed of a constitutional unit derived from ethylene, another constitutional unit derived from ethylene, and still another constitutional unit derived from ethylene.

Usually, the ratios of respective six types of triads PPP, PPE, EPE, PEP, PEE, and EEE are used for the structural analysis of propylene polymers. For the propylene resin material of the present invention, however, only five types of triads PPE, EPE, PEP, PEE, and EEE are used in order to remove contribution by a segment that is an isotactic polypropylene.

The amount of the components insoluble in boiling xylene of the propylene resin material is 4% by weight or less, where the overall weight of the propylene resin material is taken as 100% by weight (requirement (4)). The components insoluble in boiling xylene are called gel components.

The adjustment of the amount of the gel components to 4% by weight or less can improve the impact properties and the tensile elongation of molded articles.

The amount of the gel components is determined by wrapping a propylene resin material of the present invention in 500 mesh wire net (opening size: 0.0258 mm, wire diameter: 0.025 mm, material: SUS316, plain weave), dissolving in boiling xylene, and measuring the amount of insoluble matter remaining in the wire net.

The propylene resin material of the present invention containing gel components in an amount of 4% by weight or less can be obtained by dissolving a propylene resin material containing much gel components in a solvent and washing the gel components.

[Method for Producing Propylene Resin Material]

The method for producing the propylene resin material of the present invention is a method for producing the propylene resin material described above, the method comprising the step of mixing an organic peroxide with a propylene polymeric material produced via a multistage polymerization process using a polymerization catalyst and comprising a propylene homopolymer portion and a propylene-ethylene copolymer portion, the step of heating the mixture obtained via the mixing step, at a temperature lower than a decomposition temperature of the organic peroxide at which the half-life of the organic peroxide is one minute, and the step of washing the mixture heated in the heating step, with a medium containing an organic solvent.

Source materials to be used for the method for producing the propylene resin material of the present invention are described below.

<Propylene Polymeric Material>

The propylene polymeric material to be used for the production method of the present invention is a propylene polymeric material that is produced via a multistage polymerization method using a polymerization catalyst and that is composed of a propylene homopolymer portion (called P portion) and a propylene-ethylene copolymer portion (called EP portion).

From the viewpoint of improving the balance between the tensile strength and the impact resistance of molded articles, the propylene polymeric material preferably has an isotactic pentad fraction (henceforth called [mmmm]) measured by 13C—NMR of 0.97 or more, more preferably 0.98 or more. An [mmmm] closer to 1 indicates that the propylene polymeric material is a polymeric material with a higher crystallinity having a molecular structure that exhibits a higher stereoregularity.

The [mmmm] of a propylene polymeric material is expressed by a value measured for the propylene units in the propylene polymeric material.

The melt flow rate (henceforth called MFR) of the propylene polymeric material measured at 230° C. under a load 2.16 kg is preferably from 0.05 to 500 g/10 minutes, more preferably from 1 to 120 g/10 minutes, even more preferably from 1 to 80 g/10 minutes, and still even more preferably from 5 to 50 g/10 minutes from the viewpoint of improving the balance between the tensile strength and the impact resistance of molded articles and the viewpoint of improving the molding processability of a resin composition.

The propylene polymeric material can be produced via a method described below using a polymerization catalyst.

Examples of the polymerization catalyst include Ziegler type catalyst systems, Ziegler-Natta type catalyst systems, catalyst systems composed of an alkyl aluminoxane and a compound of a transition metal of Group 4 of the periodic table which compound has a cyclopentadienyl ring, catalyst systems composed of an organoaluminum compound, a compound of a transition metal of Group 4 of the periodic table which compound has a cyclopentadienyl ring, and a compound capable of reacting with the compound of the transition metal to form an ionic complex, and catalyst systems prepared by modifying catalyst components such as a compound of a transition metal of Group 4 of the periodic table which compound has a cyclopentadienyl ring, a compound capable of forming an ionic complex, and an organoaluminum compound by supporting them on inorganic particles such as silica and clay mineral. Preliminarily polymerized catalysts which are prepared by preliminarily polymerizing ethylene or an α-olefin in the presence of the aforementioned catalyst systems may also be used.

Specific examples of the catalyst systems include the catalyst systems disclosed in JP 61-218606 A, JP 5-194685 A, JP 7-216017 A, JP 9-316147 A, JP 10-212319 A, and JP 2004-182981 A.

Examples of the polymerization method include bulk polymerization, solution polymerization, slurry polymerization, and vapor phase polymerization. The bulk polymerization is a method in which polymerization is carried out using, as a medium, an olefin that is liquid at the polymerization temperature, and the solution polymerization or the slurry polymerization is a method in which polymerization is carried out in an inert hydrocarbon solvent such as propane, butane, isobutane, pentane, hexane, heptane, and octane. The vapor phase polymerization is a method in which a gaseous monomer is used as a medium and a gaseous monomer is polymerized in the medium.

Such polymerization methods may be conducted either in a batch system or in a multistage system using a plurality of polymerization reactors linked in series and these polymerization methods may be combined appropriately. From the industrial and economical point of view, a continuous vapor phase polymerization method or a bulk-vapor phase polymerization method in which a bulk polymerization method and a vapor phase polymerization method are used continuously is preferred.

The conditions of each polymerization step (polymerization temperature, polymerization pressure, monomer concentration, amount of catalyst to be charged, polymerization time, etc.) may be determined appropriately depending on the desired propylene polymeric material.

In the production of the propylene polymeric material, in order to remove a residual solvent contained in the propylene polymeric material or ultralow molecular weight oligomers by-produced during the production, the propylene polymeric material may be dried at a temperature not higher than the temperature at which the propylene polymeric material melts. Examples of the drying method include those disclosed in JP 55-75410 A and JP 2-80433 A.

The intrinsic viscosity ($[\eta]_I$) of the P portion constituting the propylene polymeric material measured in Tetralin of 135° C. is from 0.1 to 5 dl/g, preferably from 0.3 to 4 dl/g, and more preferably from 0.5 to 3 dl/g.

The content of the EP portion constituting the propylene polymeric material is preferably from 1 to 50% by weight, more preferably from 1 to 40% by weight, even more preferably from 10 to 40% by weight, and still even more preferably from 10 to 30% by weight where the overall weight of the propylene polymeric material is taken as 100% by weight.

The content of the units derived from ethylene contained in the EP portion constituting the propylene polymeric material is 20 to 70% by weight, preferably 30 to 60% by weight, and more preferably 20 to 60% by weight where the overall weight of the EP portion is taken as 100% by weight.

The intrinsic viscosity ($[\eta]_{II}$) of the EP portion constituting the propylene polymeric material measured in Tetralin of 135° C. is from 1 to 20 dl/g, preferably from 1 to 10 dl/g, and more preferably from 2 to 7 dl/g.

The ratio ($[\eta]_{II}/[\eta]_I$) of the intrinsic viscosity ($[\eta]_{II}$) of the EP portion constituting the propylene polymeric material to the intrinsic viscosity ($[\eta]_I$) of the P portion is preferably from 1 to 20, more preferably from 2 to 10, and even more preferably 2 to 9.

The intrinsic viscosity (unit: g/dl) referred to herein is a value measured via the method described below at a temperature of 135° C. using Tetralin as a solvent.

A reduced viscosity is measured at three concentrations of 0.1 g/dl, 0.2 g/dl and 0.5 g/dl with an Ubbelohde's viscometer. The intrinsic viscosity is calculated by the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), namely, by an extrapolation method in which reduced viscosities are plotted against concentrations and the concentration is extrapolated to zero.

The propylene polymeric material to be used for the production method of the present invention is a polymeric material produced by forming the P portion and the EP portion via multistage polymerization. The intrinsic viscosity of the P portion or the EP portion is determined using a polymer powder extracted from the polymerization vessel of the former stage of the multistage polymerization and then the intrinsic viscosity of the remaining polymer portion is calculated from the value of the previously determined intrinsic viscosity and the contents of the respective portions.

In the event that the propylene polymeric material composed of the P portion and the EP portion is a copolymer produced via a method in which the P portion is obtained in a former stage polymerization step and the EP portion is obtained in a latter stage step, the procedures of the measurement and the calculation of the contents and the intrinsic viscosities ($[\eta]_{Total}$, $[\eta]_I$, $[\eta]_{II}$) of the P portion and the EP portion are as follows. The intrinsic viscosity ($[\eta]_{Total}$) represents the intrinsic viscosity of the whole propylene polymeric material.

From the intrinsic viscosity ($[\eta]_I$) of the P portion obtained in the former polymerization step, the intrinsic viscosity ($[\eta]_{Total}$) of the final polymer after the latter polymerization step (i.e. the combination of the P portion and the EP portion) measured via the above-described method, and the content of the EP portion contained in the final polymer, the intrinsic viscosity $[\eta]_{II}$ of the EP portion is calculated using the following equation:

$$[\eta]_{II}=([\eta]_{Total}-[\eta]_I \times X_1)/X_{II}$$

$[\eta]_{Total}$: the intrinsic viscosity (dl/g) of the final polymer after the polymerization step of the latter stage $[\eta]_I$: the intrinsic viscosity (dl/g) of a polymer powder extracted from a polymerization reactor after the polymerization step of the earlier stage $X_I$: the weight ratio of the P portion to the whole propylene polymeric material $X_{II}$: the weight ratio of the EP portion to the whole propylene polymeric material.

$X_I$ and $X_{II}$ are calculated from the mass balance in the polymerizations.

The weight ratio ($X_{II}$) of the EP portion to the whole propylene polymeric material can also be determined by measuring the heat of crystal fusion of the P portion and that of the whole propylene polymeric material and then conducting calculation using the following equation. The amount of the heat of crystal fusion can be measured by differential scanning calorimetry (DSC).

$$X_{II}=1-(\Delta Hf)_{Total}/(\Delta Hf)$$

$(\Delta Hf)_{Total}$: the heat of fusion (cal/g) of the whole propylene polymeric material $(\Delta Hf)$: the heat of fusion (cal/g) of the P portion The ethylene content ($(C_2')_{II}$) of the EP portion in the propylene polymeric material is determined by measuring the ethylene content ($(C_2')_{Total}$) of the whole propylene polymeric material by infrared absorption spectrometry and then conducting calculation using a following equation.

$$(C_2')_{II}=(C_2')_{Total}/X_{II}$$

$(C_2')_{Total}$: the ethylene content (% by weight) of the whole propylene polymeric material $(C_2')_{II}$: the ethylene content (% by weight) of the EP portion The propylene polymeric material is obtained by producing the P portion in a first step and producing the EP portion in a second step. The polymerization is conducted using the above-described polymerization catalyst.

<Organic Peroxide (B)>

The organic peroxide to be used for the production method of the present invention is an organic peroxide that decomposes to generate a radical and then works to remove a proton from the propylene polymeric material. In view of the action to remove a proton at the heat treatment temperature of the present invention, the organic peroxide is preferably one whose decomposition temperature at which the half-life thereof becomes one minute is lower than 120° C., more preferably lower than 100° C.

Specifically, the organic peroxide is preferably at least one compound selected from the group consisting of diacyl peroxide compounds, compounds (b1) having a structure represented by the following structural formula (1), and compounds (b2) having a structure represented by the following structural formula (2).

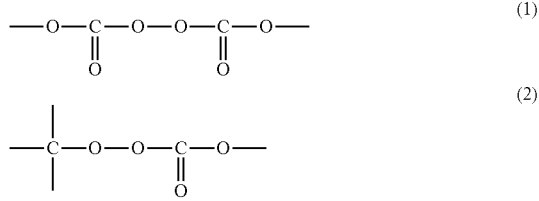

Examples of the diacyl peroxide compounds include dibenzoyl peroxide, diisobutyryl peroxide, di(3,5,5-trimethylhexanoyl) peroxide, di(4-methylbenzoyl) peroxide, and didodecanoyl peroxide.

Examples of the compound (b1) represented by structural formula (1) include dicetyl peroxydicarbonate, di-3-methoxybutyl peroxydicarbonate, di-2-ethylhexyl peroxydicarbonate, bis(4-tert-butylcyclohexyl) peroxydicarbonate, diisopropyl peroxydicarbonate, tert-butylperoxyisopropyl carbonate, and dimyristyl peroxycarbonate.

Examples of the compounds (b2) having a structure represented by the following structural formula (2) include 1,1,3,3-tetramethylbutyl neodecanoate, α-cumylperoxy neodecanoate, and tert-butylperoxy neodecanoate.

From the viewpoint of improving the impact strength and the tensile elongation at break of molded articles, the viewpoint of suppressing the generation of seeds in molded articles to improve the appearance of the molded articles, and the viewpoint of suppressing the corrosion of an extruding machine, the added amount of the organic peroxide is 0.01 to 20 parts by weight, preferably 0.01 to 10 parts by weight, and more preferably 0.1 to 5 parts by weight per 100 parts by weight of the propylene polymeric material.

Each step of the production method of the present invention is described as follows.

<Mixing Step>

The mixing step is a step of mixing 100 parts by weight of the propylene polymeric material and from 0.01 to 20 parts by weight, based on said 100 parts by weight, of the organic peroxide. As to the mixing, it is preferred to mix the propylene polymeric material and the organic peroxide uniformly using a mixing device, such as a Henschel mixer and a ribbon blender. The mixing of the propylene polymeric material with the organic peroxide is carried out for one second to one hour, preferably for 1 to 5 minutes.

<Heating Step>

The heating step is a step of heating the mixture resulting from the above-described mixing step, at a prescribed temperature by using an extruder. The heating may be conducted while further mixing the mixture. On heating within an extruder, the organic peroxide contained in the mixture is decomposed to generate free radicals, which then extract some hydrogen atoms from a propylene polymeric material, and then molecules of the propylene polymeric material from which the hydrogen atoms have been extracted will bond together. By molding a propylene polymeric material thus produced, a molded article with improved impact strength and improved tensile elongation at break can be obtained.

The heating temperature is a temperature lower than the decomposition temperature of the organic peroxide at which the half-life thereof is one minute and it is preferably from the glass transition temperature of the propylene polymeric material to the decomposition temperature of the organic peroxide at which the half-life thereof is one minute, more preferably from the glass transition temperature of the propylene polymeric material to 100° C., and even more preferably from 20 to 80° C. The heating temperature in the heating step of the production method of the present invention means the cylinder temperature of the extruder (the temperature of the kneading section).

Controlling the heating temperature to a temperature lower than the decomposition temperature of the organic peroxide at which the half-life thereof becomes one minute makes it possible to increase the high impact strength or the tensile elongation at break of a molded article, or to promote the reaction between the propylene polymeric material and the organic peroxide, or to reduce the load which is applied to the extruder.

The heating time in the heating step of the production method of the present invention (the time during which a resin stays in an extruder) is 0.1 to 30 minutes, preferably 0.5 to 10 minutes.

Examples of the extruder that can be used in the heating step include a single screw extruder, a twin screw extruder, a multi-screw extruder. A kneader, a Banbury mixer, a Brabender plastograph, etc. also can be used. Alternatively, an extruder having a solid phase shearing region (see U.S. Pat. Nos. 4,607,797 and 6,494,390), an extruder having a solid phase shearing region and a melt-kneading region (see JP 2005-281379 A), etc. also can be used.

Furthermore, a high shear kneading machine equipped with an internal feedback screw can be used (see JP 2005-313608 A). In particular, it is preferred to use an extruder by which production can be done continuously. Two or more types of extruders selected from among the above may be used together. For example, it is permitted to separate a kneading step and an extrusion step with two types of extruders arranged consecutively (tandem type, etc.). An extruder having two or more raw material feed port can be used.

The extruder preferably has a raw material feeding section, a kneading section, a venting section, and an extruding section. From the viewpoint of removing heat generated from shearing, it is preferred that the screw and the cylinder can be cooled with a refrigerant, such as water.

<Washing Step>

The washing step is a step of washing the above-described mixture by removing gel components with a medium that contains an organic solvent and that improves the molecular mobility of the propylene polymeric material contained in the mixture heated in the above-described heating step or improves the molecular mobility of the propylene homopolymer portion and the propylene-ethylene copolymer portion contained in the polymeric material. In order to increase the removal efficiency of the gel components, it is preferred to pass the mixture resulting from the washing through a wire gauze or the like. In addition, it is preferred to evaporate the residual solvent.

Examples of the form of the propylene resin material include a strand, a sheet, and a pellet produced by cutting a strand. In order to form the propylene resin material of the present invention to produce a molded article stably, the form is preferably a pellet having a length of 1 to 50 mm.

In order to produce a propylene resin material that is well inhibited from generating gels or from deteriorating in moldability during processing and that is capable of affording a molded article improved in impact strength and tensile elongation at break and having good surface appearance, it is preferred to conduct the heating step so that the MFR of a mixture resulting from the heating step may become from 0.5 times to 2 times, more preferably from 0.7 times to 1.5 times the MFR of the propylene polymeric material before the heating step.

The resin composition of the present invention is a resin composition containing a propylene resin material of the present invention, and a propylene polymeric material that is produced using a polymerization catalyst via a multistage polymerization process and that is composed of a propylene homopolymer portion and a propylene-ethylene copolymer portion.

The resin composition of the present invention is a resin composition containing a propylene polymer material of the present invention, and a propylene polymeric material that is produced using a polymerization catalyst via a multistage polymerization process and that is composed of a propylene homopolymer portion and a propylene-ethylene copolymer portion, an ethylene-α-olefin copolymer rubber, and an inorganic filler.

Similar propylene polymeric materials as used as a source material in a method for producing the above-described propylene resin material of the present invention are used as the propylene polymeric material that is produced using a polymerization catalyst via a multistage polymerization process and that is composed of a propylene homopolymer portion and a propylene-ethylene copolymer portion.

The ethylene-α-olefin copolymer rubber to be used for the resin composition of the present invention is a copolymer of ethylene with an α-olefin, the copolymer having a density of 0.85 to 0.93 (g/cm$^3$). Preferred is a copolymer of ethylene with an α-olefin, the copolymer having a density of 0.85 to 0.90 (g/cm$^3$), low crystallinity, and a rubbery elastomeric property.

Specific examples of the ethylene-α-olefin copolymer rubber include ethylene-1-butene copolymer rubbers, ethylene-1-hexene copolymer rubbers, ethylene-1-octene copolymer rubbers, ethylene-1-decene copolymer rubbers, ethylene-(3-methyl-1-butene) copolymer rubbers, and copolymer rubbers of ethylene with an α-olefin having a cyclic structure.

The α-olefin to be used for the ethylene-α-olefin copolymer rubber is an α-olefin having 4 to 10 carbon atoms; examples thereof include 1-butene, 1-pentene, 1-hexene, 4-methyl-1-heptene, 1-octene, and 1-decene, and α-olefins having a cyclic structure, and 1-butene, 1-hexene and 1-octene are preferred.

The content of the constitutional units derived from an α-olefin contained in the ethylene-α-olefin copolymer rubber is preferably 1 to 49% by weight, more preferably 5 to 49% by weight, even more preferably 10 to 49% by weight where the overall weight of the ethylene-α-olefin copolymer rubber is taken as 100% by weight.

The melt flow rate of the ethylene-α-olefin copolymer rubber measured at a temperature of 190° C. and a load of 21.18 N is preferably 0.5 to 50 g/10 minutes, more preferably 1 to 30 g/10 minutes, and even more preferably 1 to 20 g/10 minutes.

The ethylene-α-olefin copolymer rubber can be produced using a polymerization catalyst. Examples of the polymerization catalyst include homogeneous catalyst systems and Ziegler-Natta type catalyst systems.

Examples of the homogeneous catalyst systems include catalyst systems composed of an alkyl aluminoxane and a compound of a transition metal of Group 4 of the periodic table which compound has a cyclopentadienyl ring, catalyst systems composed of an organoaluminum compound, a compound of a transition metal of Group 4 of the periodic table which compound has a cyclopentadienyl ring, and a compound capable of reacting with the compound of the transition metal to form an ionic complex, and catalyst systems prepared by supporting and modifying catalyst components such as a Group 4 transition metal compound having a cyclopentadienyl ring, a compound capable of forming an ionic complex, and an organoaluminum compound on inorganic particles such as silica and clay mineral. Additional examples include preliminarily polymerized catalyst systems which are prepared by preliminarily polymerizing ethylene or an α-olefin in the presence of the aforementioned catalyst systems.

Examples of the Ziegler-Natta catalyst system include a catalyst system comprising a combination of a titanium-containing solid transition metal component and an organometallic component.

When using a high pressure low density polyethylene (LDPE), a radical initiator can be used as a polymerization catalyst.

As the ethylene-α-olefin copolymer rubber, ENGAGE (registered trademark) produced by Dow Chemical Japan, Ltd., TAFMER (registered trademark) produced by Mitsui Chemicals, Inc., NEOZEX (registered trademark) and ULTZEX (registered trademark) produced by Prime Polymer Co., Ltd., and EXCELLEN FX (registered trademark), SUMIKATHENE (registered trademark), and ESPLENE SPO (registered trademark) produced by Sumitomo Chemical Co., Ltd. can be used.

Into the propylene resin material of the present invention may be incorporated other resins, rubber components, inorganic fillers, additives, etc.

Examples of such resins to be incorporated into the propylene resin material of the present invention include thermoplastic resins such as polystyrene resins, ABS (acrylonitrile/butadiene/styrene copolymerized) resins, AAS (special acrylic rubber/acrylonitrile/styrene copolymerized) resins, ACS (acrylonitrile/chlorinated polyethylene/styrene copolymerized) resins, polychloroprene, chlorinated rubbers, polyvinyl chloride, polyvinylidene chloride, acrylic resins, ethylene/vinyl alcohol copolymerized resins, fluororesins, polyacetal, polyphenylene ether resins, polyurethane, polyamide, polyester resins, polycarbonate, polysulfone, polyetheretherketone, polyethersulfone, aromatic polyester resins, polyethylene, and polypropylene other than the propylene resin material of the present invention as well as epoxy resins, diallyl phthalate prepolymers, silicone resins, silicone rubbers, polybutadiene, 1,2-polybutadiene, polyisoprene, styrene/butadiene copolymers, butadiene/acrylonitrile copolymers, epichlorohydrin rubbers, acrylic rubbers, and natural rubbers.

The resin composition of the present invention may contain a polymer produced by polymerizing a plant-derived monomer extracted from a biofeed. Examples thereof include polylactic acid resins (PLA resins) and PBT resins.

Examples of the inorganic filler to be used for the resin composition of the present invention include non-fibrous inorganic fillers and fibrous inorganic fillers.

Examples of the non-fibrous inorganic fillers include talc, mica, calcium carbonate, barium sulfate, magnesium carbonate, clay, alumina, silica, calcium sulfate, quartz sand, carbon black, titanium oxide, magnesium hydroxide, zeolite, molybdenum, diatomaceous earth, sericite, SHIRASU (light gray volcanic ash), calcium hydroxide, calcium sulfite, sodium sulfate, bentonite, graphite, etc. These may be used singly or two or more of them may be used in combination. Preferred out of these is talc.

The non-fibrous inorganic filler may be used without being subjected to any treatment. In order to improve surface adhesiveness to the propylene resin material of the present invention and to improve dispersibility in the propylene resin material, the surface of the non-fibrous inorganic filler may be treated with a silane coupling agent, a titanium coupling agent, or a surfactant. Examples of the surfactant include higher fatty acids, higher fatty acid esters, higher fatty acid amides and higher fatty acid salts.

The average particle diameter of the non-fibrous inorganic filler is 10 μm or less, preferably 5 μm or less. The "average particle diameter" in the present invention means a 50% equivalent particle diameter D50 that is determined from an integral distribution curve of the sub-sieve method produced through measurement conducted with particles being suspended in a dispersing medium, such as water and alcohol, by means of a centrifugal sedimentation type particle size distribution analyzer.

Examples of the form of the non-fibrous inorganic filler include powder, flake, and granule.

Examples of the fibrous inorganic fillers include fibrous magnesium oxysulfate, fibrous potassium titanate, fibrous magnesium hydroxide, fibrous aluminum borate, fibrous calcium silicate, fibrous calcium carbonate, carbon fiber, glass fiber, and metal fiber. These may be used singly or two or more of them may be used in combination. Out of these, the use of fibrous magnesium oxysulfate or fibrous calcium silicate is preferred, and the use of fibrous magnesium oxysulfate is more preferred.

The fibrous inorganic filler may be used without being subjected to any treatment. The fibrous inorganic filler may be used after being treated on the surface thereof with a silane coupling agent or a metal salt of a higher fatty acid in order to improve surface adhesiveness to the propylene resin material of the present invention and to improve dispersibility in the propylene resin material. Examples of the metal salt of a higher fatty acid include calcium stearate, magnesium stearate, and zinc stearate.

The average fiber length of the fibrous inorganic filler measured by electron microscopic observation is preferably 3 μm or more, more preferably 3 μm to 20 μm, and even more preferably 8 μm to 15 μm. The aspect ratio is preferably 10 or more, more preferably 10 to 30, and even more preferably 12 to 25. The average fiber diameter measured by electron microscopic observation is preferably 0.2 μm to 1.5 μm, and more preferably is 0.3 μm to 1.0 μm.

The method for producing the resin composition of the present invention is a method that comprises melt-kneading the propylene resin material of the present invention with a propylene polymeric material, or a method that comprises melt-kneading the present invention with a propylene polymeric material and an inorganic filler; for the melt-kneading, a Banbury mixer, a single screw extruder, a twin screw extruder, etc. can be used and a combination of two or more extruders also can be used. From the viewpoint of improving productivity, a twin screw extruder is preferred.

The preset temperature of the extruder in melt-kneading is 150° C. of higher, preferably 160 to 300° C., more preferably 170 to 250° C.

Examples of the method for feeding a propylene resin material, a propylene polymeric material, and an inorganic filler to an extruder include a method of feeding the propylene resin material, the propylene polymeric material, and the inorganic filler wholly through a hopper mounted at the uppermost stream part and a method of feeding arbitrary ingredients in portions at the middle of an extruder via a side feed or the like.

An additive may optionally be added to the propylene resin material of the present invention or the resin composition of the present invention. Examples of the additives include a neutralizer, an antioxidant, a UV absorber, a lubricant, an antistatic agent, an antiblocking agent, a processing aid, a coloring agent, a foaming agent, a foam nucleating agent, a plasticizer, a flame retardant, a crosslinking agent, a crosslinking aid, a brightening agent, an antibacterial agent, and a light diffusing agent. Such additives may be used singly or in combination.

The propylene resin material of the present invention or the resin composition of the present invention can be used for an injection molded article, a blow molded article, a sheet-formed article, a laminated article, and a foam molded article.

EXAMPLES

The present invention is further described below with reference to Examples and Comparative Examples. The propylene polymer (A), the organic peroxide (B), etc. used in Examples and Comparative Examples are given below.
Propylene polymeric material
(A–1) Propylene polymeric material
   Melt flow rate (measured at a temperature of 230° C. and a load of 2.16 kg): 22 g/10 minutes
   Propylene homopolymer portion (P portion)
   Intrinsic viscosity $[\eta]_I$: 1.04 dl/g
   Propylene-ethylene block copolymer portion (EP portion)
   Intrinsic viscosity $([\eta]_{II})$: 2.61 dl/g
   Content of the constitutional units derived from ethylene contained in EP portion $((C2')_{II})$: 54.6% by weight, where the overall weight of the EP portion is taken as 100% by weight.
   Content of the EP portion contained in the propylene polymeric material: 26% by weight, where the overall weight of the propylene polymeric material is taken as 100% by weight.
Organic peroxide
Compound name: Dicetyl peroxydicarbonate
   Decomposition temperature at which the half-life becomes 1 minute: 99° C.
Neutralizer: calcium stearate produced by NOF Corporation
Antioxidant: SUMILIZER GA80 produced by Sumitomo Chemical Co., Ltd.
Antioxidant: SONGNOX 6260 produced by Songwon Industrial Co., Ltd.

The physical properties of the propylene resin materials of the present invention, the resin compositions of the present invention, and the propylene polymeric materials to be used for the present invention were measured in accordance with the methods described below.
(1) Melt Flow Rate (MFR; Unit: g/10 min.)

The melt flow rates of the propylene resin materials, the resin compositions, and the propylene polymeric materials were measured in accordance with the method provided in JIS K7210. The measurement was performed at a temperature of 230° C. and a load of 2.16 kg.
(2) Amount of Gel Component (Unit: % by Weight)

The amount of gel components of a propylene resin material or a propylene polymerized material was measured in the following procedures. A 500-mesh wire gauze (opening size:

0.0258 mm, wire diameter: 0.025 mm, material: SUS316, plain weave) having dimensions 300 mm by 300 mm was folded into a pleated form in a fashion of pleating a filter paper and then 5 g of a propylene resin material or a propylene polymeric material was put into the pleated wire gauze. The edge of the open side was gathered and tied with a wire, thereby processed so that the propylene resin material or the propylene polymeric material would not leak. Subsequently, the sample was sunk in 1000 ml of xylene (containing 0.1 g of BHT dissolved) and rinsing was conducted for 30 minutes in boiling xylene. The wire gauze was taken up, washed with xylene, vacuum dried, and then weighed. Thus, the weight of the insoluble residue (i.e. gel components) remaining in the wire gauze was determined. From the determined amount of the gel components and the initial amount of the sample, the ratio of the gel components (% by weight) was calculated by the following formula.

The ratio of gel components (% by weight)=the amount of gel component (g)/the initial amount of the sample (g)×100

(3) Content of Components Soluble in 20° C. Xylene (CXS) and Content of Components Insoluble in 20° C. Xylene (CXIS) (Unit: % by Weight)

For measuring the CXS and the CXIS of a propylene resin material or a propylene polymeric material, 400 mL of xylene was added to 2 g of the propylene resin material or the propylene polymeric material and then was boiled to dissolve the material completely. Subsequently, the temperature was lowered and conditioning was carried out at 20° C. for one hour or more. Subsequently, the resultant was separated with a filter paper into a soluble portion and an insoluble portion. The solvent was removed from the filtrate and then the residue was dried up, affording CXS. On the other hand, the residue remaining on the filter paper was dried up, affording CXIS. Subsequently, the CXS and the CXIS were weighed.

(4) EPcxis (Unit: %)

The content of constitutional units derived from ethylene contained in the CXS component (C2'CXS) and the content of constitutional units derived from ethylene contained in the CXIS component (C2'CXIS) were determined in accordance with the method disclosed in the report produced by Kakugo et al. (Macromolecules, 1982, Vol. 15, pp. 1150-1152) by using the $^{13}$C—NMR of a propylene resin material measured with a nuclear magnetic resonance spectrometer (NMR). EPcxis was calculated from formula: C2'CXIS/C2'CXS×100.

[Measurement Conditions]

Instrument: AVANCE600 with a 10 mm cryoprobe manufactured by Bruker

Measurement solvent: mixed solvent of 1,2-dichlorobenzene/1,2-dichlorobenzene-d4=75/25 (volumetric ratio)

Measurement temperature: 130° C.

Measurement method: proton decoupling method

Pulse width: 45 degrees

Pulse repetition time: 4 seconds

Chemical shift standard: tetramethylsilane $$PPP = \frac{\text{Area of } T_{\beta\beta}}{\text{Area of} \left( \begin{array}{c} T_{\beta\beta} + T_{\beta\delta} + T_{\delta\delta} + 0.5 S_{\beta\beta} + \\ 0.25 S_{\alpha\gamma} + 0.5 S_{\alpha\delta} + 0.5 S_{\beta\delta} + 0.5 S_{\delta\delta} + 0.25 S_{\gamma\delta} \end{array} \right)}$$

-continued $$PPE = \frac{\text{Area of } T_{\beta\delta}}{\text{Area of} \left( \begin{array}{c} T_{\beta\beta} + T_{\beta\delta} + T_{\delta\delta} + 0.5 S_{\beta\beta} + \\ 0.25 S_{\alpha\gamma} + 0.5 S_{\alpha\delta} + 0.5 S_{\beta\delta} + 0.5 S_{\delta\delta} + 0.25 S_{\gamma\delta} \end{array} \right)}$$

$$EPE = \frac{\text{Area of } T_{\delta\delta}}{\text{Area of} \left( \begin{array}{c} T_{\beta\beta} + T_{\beta\delta} + T_{\delta\delta} + 0.5 S_{\beta\beta} + \\ 0.25 S_{\alpha\gamma} + 0.5 S_{\alpha\delta} + 0.5 S_{\beta\delta} + 0.5 S_{\delta\delta} + 0.25 S_{\gamma\delta} \end{array} \right)}$$

$$PEP = \frac{\text{Area of } (0.5 S_{\beta\beta} + 0.25 S_{\alpha\gamma})}{\text{Area of} \left( \begin{array}{c} T_{\beta\beta} + T_{\beta\delta} + T_{\delta\delta} + 0.5 S_{\beta\beta} + \\ 0.25 S_{\alpha\gamma} + 0.5 S_{\alpha\delta} + 0.5 S_{\beta\delta} + 0.5 S_{\delta\delta} + 0.25 S_{\gamma\delta} \end{array} \right)}$$

$$PEE = \frac{\text{Area of } (0.5 S_{\alpha\delta} + 0.5 S_{\beta\delta})}{\text{Area of} \left( \begin{array}{c} T_{\beta\beta} + T_{\beta\delta} + T_{\delta\delta} + 0.5 S_{\beta\beta} + \\ 0.25 S_{\alpha\gamma} + 0.5 S_{\alpha\delta} + 0.5 S_{\beta\delta} + 0.5 S_{\delta\delta} + 0.25 S_{\gamma\delta} \end{array} \right)}$$

$$EEE = \frac{\text{Area of } (0.5 S_{\delta\delta} + 0.25 S_{\gamma\delta})}{\text{Area of} \left( \begin{array}{c} T_{\beta\beta} + T_{\beta\delta} + T_{\delta\delta} + 0.5 S_{\beta\beta} + \\ 0.25 S_{\alpha\gamma} + 0.5 S_{\alpha\delta} + 0.5 S_{\beta\delta} + 0.5 S_{\delta\delta} + 0.25 S_{\gamma\delta} \end{array} \right)}$$

$$C'_2 = \frac{(PEP + PEE + EEE) \times 28}{(PEP + PEE + EEE) \times 28 + (PPP + PPE + EPE) \times 42}$$

(5) Tensile Test (Energy, Unit: J; Elongation at Break, Unit: %)

A test piece for tensile test of a propylene resin material or a propylene polymerized material was prepared by producing a 1 mm thick sheet by pressing at 230° C. and then cutting the sheet into a rectangle shape being 12.7 mm wide, 64 mm long. Further, on both side faces, at the mid point in the longitudinal direction (the point of 32 mm from the ends), V notches sized in accordance with JIS were formed.

Using the test piece produced, a tensile test was conducted in a −30° C. atmosphere, and then an absorbed energy (J) until rupture and the elongation (%) until rupture were calculated from the area of an S-S curve.

(6) Izod Impact Test (Izod, Unit: kg/m$^2$)

An Izod impact test piece of a propylene resin material or a propylene polymeric material was prepared by producing a 3 mm thick sheet by pressing at 230° C., cutting the sheet into a rectangle shape 12.7 mm wide, 63.5 mm long, and then forming a V notch sized in accordance with JIS.

Using the test piece prepared, an Izod impact test was conducted after conditioning at 23° C.

(7) Seed (Unit: Seed(s))

A surface of a press molded article made of a propylene resin material or a propylene polymeric material was observed with a magnifier, and the number of seeds larger than 200 μm in size was counted.

Example 1

One hundred parts by weight of a propylene polymeric material (A-1), 1 part by weight of an organic peroxide (dicetyl peroxydicarbonate), 0.05 parts by weight of calcium stearate, 0.05 parts by weight of SUMILIZER GA, and 0.1 parts by weight of SONGNOX 6260 were weighed, mixed uniformly, and then heated by using a single screw extruder, affording a mixture of the propylene polymerized material (A-1) and the organic peroxide (dicetyl peroxydicarbonate). The preset temperature of the cylinder was 40° C. and the preset screw rotation speed was 65 rpm.

Subsequently, a 500-mesh wire gauze (opening size: 0.0258 mm, wire diameter: 0.025 mm, material: SUS316, plain weave) having dimensions 300 mm by 300 mm was folded into a pleated form in a fashion of pleating a filter paper and then 5 g of the mixture prepared above was put into the pleated wire gauze. The edge of the open side was gathered and tied with a wire, thereby processed so that the mixture would not leak. Subsequently, the sample was sunk in 1000 ml of xylene (containing 0.1 g of BHT dissolved) and rinsing was conducted for 30 minutes in boiling xylene. The mixture rinsed and dissolved through the wire gauze into xylene was concentrated to dryness with an evaporator and then vacuum dried, affording a propylene resin material having a gel component content of 0% by weight.

Comparative Example 1

A propylene resin material was obtained by conducting mixing, heating, and rinsing in the same manner as in Example 1 except for failing to use an organic peroxide.

Comparative Example 2

A propylene resin material was obtained by conducting mixing and heating in the same manner as in Example 1 except for failing to use a 500 mesh wire gauze in the rinsing step.

TABLE 1

|  |  |  | Example 1 | Comparative Example 1 | Comparative Example 2 |
|---|---|---|---|---|---|
| Composition | Propylene polymeric material (A-1) | parts by weight | 100 | 100 | 100 |
|  | Organic peroxide | parts by weight | 1 | 0 | 1 |
| Structural value | Amount of gel component | wt % | 0 | 0 | 4.5 |
|  | EPcxis |  | 133 | 97 | — |
|  | ΔEP | % | 15 | 21 | — |
| Property | Tensile test (−30° C.) Energy until break | J | 0.74 | 0.59 | 0.35 |
|  | Tensile test (−30° C.) Elongation at break | % | 12.5 | 10.3 | 6.6 |
|  | Izod test (23° C.) | kJ/m² | 10.1 | 7.3 | 11.8 |
|  | Appearance of molded article Number of seeds | seeds/9 cm² | 14 | 14 | 154 |

What is claimed is:

1. A propylene resin material comprising a propylene homopolymer portion (I) and a propylene-ethylene copolymer portion (II), wherein the propylene resin material satisfies the following requirements (1), (2), (3), and (4):

requirement (1): the copolymer portion (II) comprises constitutional units derived from propylene and constitutional units derived from ethylene, wherein the content of the constitutional units derived from ethylene is 20 to 70% by weight where the overall weight of the copolymer portion (II) is taken as 100% by weight;

requirement (2): the value of EPcxis calculated from a formula: EPcxis =(C2'CXIS/C2'CXS) x100 is 100 or more where the content of the constitutional units derived from ethylene contained in the components soluble in xylene at 20° C. of the propylene resin material is represented by C2'CXS, the components soluble in xylene at 20° C. are collectively named CXS, the content of the constitutional units derived from ethylene contained in the components insoluble in xylene at 20° C. of the propylene resin material is represented by C2'CXIS, the components insoluble in xylene at 20° C. are collectively named CXIS;

requirement (3): the arithmetic mean (ΔEP) of the polypropylene resin material determined by the following procedures (1) through (5) is 20% or less;

(1) the contents of five types of triads $PPE_{CXS}$, $EPE_{CXS}$, $PEP_{CXS}$, $PEE_{CXS}$, and $EEE_{CXS}$ contained in the CXS, and the contents of five types of triads $PPE_{CXIS}$, $EPE_{CXIS}$, PEPcms, $PEE_{CXIS}$, and $EEE_{CXIS}$ contained in the CXIS are measured using $^{13}$C-NMR;

(2) the ratios, $PPE^{EP}_{CXS}$, $EPE^{EP}_{CXS}$, $PEP^{EP}_{CXS}$, $PEE^{EP}_{CXS}$, and $EEE^{EP}_{CXS}$, of the respective five types of triads contained in the CXS to the sum total of the contents of the five types of triads are calculated from the following equations;

$$PPE^{EP}_{CXS} = \frac{PPE_{CXS}}{PPE_{CXS} + EPE_{CXS} + PEP_{CXS} + PEE_{CXS} + EEE_{CXS}}$$

$$EPE^{EP}_{CXS} = \frac{EPE_{CXS}}{PPE_{CXS} + EPE_{CXS} + PEP_{CXS} + PEE_{CXS} + EEE_{CXS}}$$

$$PEP^{EP}_{CXS} = \frac{PEP_{CXS}}{PPE_{CXS} + EPE_{CXS} + PEP_{CXS} + PEE_{CXS} + EEE_{CXS}}$$

$$PEE^{EP}_{CXS} = \frac{PEE_{CXS}}{PPE_{CXS} + EPE_{CXS} + PEP_{CXS} + PEE_{CXS} + EEE_{CXS}}$$

$$EEE^{EP}_{CXS} = \frac{EEE_{CXS}}{PPE_{CXS} + EPE_{CXS} + PEP_{CXS} + PEE_{CXS} + EEE_{CXS}}$$

(3) the ratios, $PPE^{EP}_{CXIS}$, $EPE^{EP}_{CXIS}$, $PEP^{EP}_{CXIS}$, $PEE^{EP}_{CXIS}$, and $EEE^{EP}_{CXIS}$, of the respective five types of triads contained in the CXIS to the sum total of the contents of the five types of triads are calculated from the following equations;

$$PPE^{EP}_{CXIS} = \frac{PPE_{CXIS}}{PPE_{CXIS} + EPE_{CXIS} + PEP_{CXIS} + PEE_{CXIS} + EEE_{CXIS}}$$

$$EPE^{EP}_{CXIS} = \frac{EPE_{CXIS}}{PPE_{CXIS} + EPE_{CXIS} + PEP_{CXIS} + PEE_{CXIS} + EEE_{CXIS}}$$

$$PEP^{EP}_{CXIS} = \frac{PEP_{CXIS}}{PPE_{CXIS} + EPE_{CXIS} + PEP_{CXIS} + PEE_{CXIS} + EEE_{CXIS}}$$

$$PEE^{EP}_{CXIS} = \frac{PEE_{CXIS}}{PPE_{CXIS} + EPE_{CXIS} + PEP_{CXIS} + PEE_{CXIS} + EEE_{CXIS}}$$

-continued $$EEE_{CXIS}^{EP} = \frac{EEE_{CXIS}}{PPE_{CXIS} + EPE_{CXIS} + PEP_{CXIS} + PEE_{CXIS} + EEE_{CXIS}}$$

(4) using $PPE^{EP}_{CXS}$, $EPE^{EP}_{CXS}$, $PEP^{EP}_{CXS}$, $PEE^{EP}_{CXS}$, and $EEE^{EP}_{CXS}$ calculated in the above (2) and $PPE^{EP}_{CXIS}$, $EPE^{EP}_{CXIS}$, $PEP^{EP}_{CXIS}$, $PEE^{EP}_{CXIS}$, and $EEE^{EP}_{CXIS}$ calculated in the above (3), the absolute value ($\Delta PPE^{EP}$) of the difference between $PPE^{EP}_{CXS}$ and $PPE^{EP}_{CXIS}$, the absolute value ($\Delta EPE^{EP}$) of the difference between $EPE^{EP}_{CXS}$ and $EPE^{EP}_{CXIS}$, the absolute value ($\Delta PEP^{EP}$) of the difference between $PEP^{EP}_{CXS}$ and $PEP^{EP}_{CXIS}$, the absolute value ($\Delta PEE^{EP}$) of the difference between $PEE^{EP}_{CXS}$ and $PEE^{EP}_{CXIS}$, and the absolute value ($\Delta EEE^{EP}$) of the difference between $EEE^{EP}_{CXS}$ and $EEE^{EP}_{CXIS}$ are calculated from the following equations, $$\Delta PPE^{EP} = |PPE^{EP}_{CXIS} - PPE^{EP}_{CXS}|$$

$$\Delta EPE^{EP} = |EPE^{EP}_{CXIS} - EPE^{EP}_{CXS}|$$

$$\Delta PEP^{EP} = |PEP^{EP}_{CXIS} - PEP^{EP}_{CXS}|$$

$$\Delta PEE^{EP} = |PEE^{EP}_{CXIS} - PEE^{EP}_{CXS}|$$

$$\Delta EEE^{EP} = |EEE^{EP}_{exis} - EEE^{EP}_{CXS}|$$

(5) using $\Delta PPE^{EP}$, $\Delta EPE^{EP}$, $\Delta PEP^{EP}$, $\Delta PEE^{EP}$, and $\Delta EEE^{EP}$ calculated in the above (4), the arithmetic mean $\Delta EP$ is calculated from the following equation.

$$\Delta EP = \frac{\Delta PPE^{EP} + \Delta EPE^{EP} + \Delta PEP^{EP} + \Delta EEP^{EP} + \Delta EEE^{EP}}{5} \times 100$$

where
P denotes a constitutional unit derived from propylene,
E denotes a constitutional unit derived from ethylene,
PPE denotes a triad composed of a constitutional unit derived from propylene, another constitutional unit derived from propylene, and a constitutional unit derived from ethylene,
EPE denotes a triad sequentially composed of a constitutional unit derived from ethylene, a constitutional unit derived from propylene, and another constitutional unit derived from ethylene,
PEP denotes a triad sequentially composed of a constitutional unit derived from propylene, a constitutional unit derived from ethylene, and another constitutional unit derived from propylene,
PEE denotes a triad sequentially composed of a constitutional unit derived from propylene, a constitutional unit derived from ethylene, and another constitutional unit derived from ethylene,
EEE denotes a triad sequentially composed of a constitutional unit derived from ethylene, another constitutional unit derived from ethylene, and still another constitutional unit derived from ethylene,
requirement (4): the amount of the components insoluble in boiling xylene of the propylene resin material is 4% by weight or less, where the overall weight of the propylene resin material is taken as 100% by weight; and
wherein the material is prepared by a process comprising heating a mixture of an organic peroxide with a propylene polymeric material produced via a multistage polymerization process using a polymerization catalyst and comprising a propylene homopolymer portion and a propylene-ethylene copolymer portion, and heating the mixture at a temperature lower than a decomposition temperature of the organic peroxide at which the half-life of the organic peroxide is one minute.

2. A method for producing a propylene resin material according to claim 1, the method comprising the step of mixing an organic peroxide with a propylene polymeric material produced via a multistage polymerization process using a polymerization catalyst and comprising a propylene homopolymer portion and a propylene-ethylene copolymer portion, the step of heating the mixture obtained via the mixing step, at a temperature lower than a decomposition temperature of the organic peroxide at which the half-life of the organic peroxide is one minute, and the step of washing the mixture heated in the heating step, with a medium containing an organic solvent.

3. A resin composition comprising a propylene resin material according to claim 1, and a propylene polymeric material produced via a multistage polymerization process using a polymerization catalyst and comprising a propylene homopolymer portion and a propylene-ethylene copolymer portion.

4. A resin composition comprising a propylene resin material according to claim 1, and a propylene polymeric material produced via a multistage polymerization process using a polymerization catalyst and comprising a propylene homopolymer portion and a propylene-ethylene copolymer portion, and an ethylene-α-olefin copolymer rubber.

* * * * *